US012045191B2

(12) United States Patent
Voglgsang et al.

(10) Patent No.: US 12,045,191 B2
(45) Date of Patent: Jul. 23, 2024

(54) SERIAL INTERFACE

(71) Applicant: Endress+Hauser Flowtec AG, Reinach (CH)

(72) Inventors: Dominik Voglgsang, Binzen (DE); André Schaubhut, Schopfheim (DE); Christian Knapp, Albbruck (DE); Thomas Küng, Münchenstein (CH)

(73) Assignee: Endress+Hauser Flowtec AG, Reinach (CH)

( * ) Notice: Subject to any disclaimer, the term of this patent is extended or adjusted under 35 U.S.C. 154(b) by 31 days.

(21) Appl. No.: 17/757,382

(22) PCT Filed: Dec. 1, 2020

(86) PCT No.: PCT/EP2020/084081
§ 371 (c)(1),
(2) Date: Jun. 15, 2022

(87) PCT Pub. No.: WO2021/121959
PCT Pub. Date: Jun. 24, 2021

(65) Prior Publication Data
US 2023/0025913 A1    Jan. 26, 2023

(30) Foreign Application Priority Data

Dec. 18, 2019 (DE) ............... 10 2019 134 907.9

(51) Int. Cl.
*G06F 13/42* (2006.01)
*G06F 13/40* (2006.01)
(52) U.S. Cl.
CPC ...... *G06F 13/4282* (2013.01); *G06F 13/4068* (2013.01)
(58) Field of Classification Search
CPC ............ G06F 13/4282; G06F 13/4068
(Continued)

(56) References Cited

U.S. PATENT DOCUMENTS 4,890,219 A * 12/1989 Heath ............... G06F 13/24
710/260
6,145,047 A * 11/2000 Garinger ............ G06F 13/24
710/260
(Continued)

FOREIGN PATENT DOCUMENTS

CN    207457752 U    6/2018
CN    209514359 U    10/2019
(Continued)

OTHER PUBLICATIONS

Marais, Hein, RS-485/RS-422 Circuit Implementation Guide, AN-960 Application Note, Analog Devices, v www.analog.com, 12 pp.
(Continued)

*Primary Examiner* — Paul R. Myers
(74) *Attorney, Agent, or Firm* — Mark A. Logan; Endress+Hauser (USA) Holding, Inc.

(57) ABSTRACT

An electronic unit comprises a microcontroller with a control input, a control output, and a signal input; and an interface circuit with a connection terminal, a control output, a control input, and a signal output. Both the microcontroller and the interface circuit each have a first operating mode and a second operating mode. The microcontroller is designed to cause the interface circuit to operate in its first operating mode. The interface circuit is designed to convert an input signal into a derivation signal representing a derivation of the input signal over time and to generate a control signal from the derivation signal. The microcontroller is designed to cause the interface circuit to operate in its second operating mode and to receive and convert a digital input signal and to output an output signal to the microcontroller.

29 Claims, 7 Drawing Sheets

(58) Field of Classification Search
USPC .......................................................... 710/106
See application file for complete search history.

(56) References Cited

U.S. PATENT DOCUMENTS

| | | | |
|---|---|---|---|
| 2004/0176921 A1* | 9/2004 | Lacy | .................. G01R 13/0254 |
| | | | 702/66 |
| 2008/0015799 A1 | 1/2008 | Lalla | |
| 2010/0026518 A1 | 2/2010 | Kirst et al. | |
| 2011/0208440 A1 | 8/2011 | Pechstein et al. | |
| 2015/0341179 A1 | 11/2015 | Butler et al. | |

FOREIGN PATENT DOCUMENTS

| | | |
|---|---|---|
| DE | 10103504 A1 | 8/2001 |
| DE | 102006030963 A1 | 2/2008 |
| DE | 102005063054 A1 | 8/2011 |
| DE | 102015114442 A1 | 3/2017 |
| DE | 102015115273 A1 | 3/2017 |
| EP | 2199881 A1 | 6/2010 |
| WO | 2006026749 A2 | 3/2006 |

OTHER PUBLICATIONS

High Speed, Isolated RS-485 Transceiver with Integrated Transformer Driver, ADM2485, Analog Devices, www.analog.com, 20 pp.

\* cited by examiner

SERIAL INTERFACE

CROSS-REFERENCE TO RELATED APPLICATIONS

The present application is related to and claims the priority benefit of DPMA Patent Application No. 10 2019 134 907.9, filed on Dec. 18, 2019, and International Patent Application No. PCT/EP2020/084081, filed Dec. 1, 2020, the entire contents of which are incorporated herein by reference.

TECHNICAL FIELD

The invention relates to an electronic unit having a microcontroller and an interface circuit electrically connected thereto.

BACKGROUND

US-A 2008/015799, US-A 2010/0026518 or US-A 2011/0208440 in each case show an electronic unit, in particular for one or more measuring devices, and a measuring system having such an electronic unit and one or more sensors connected thereto.

The electronic unit—which is designed here as a transducer of a measuring system of industrial measuring and automation technology that transmits measurement data to a remote signal receiver—comprises a microprocessor or a microcontroller formed therewith, and also an interface circuit electrically connected thereto, namely an electronic circuit that is useful for communication with an external signal receiver and/or transmitter, which communication may also be non-proprietary or standardized. In order to provide the electrical power required during operation, in some cases also with different operating voltages, the electronic unit also has a corresponding supply circuit. The supply circuit or the supply circuit formed therewith can be, for example, mains-powered and/or battery-powered. Accordingly, the electronic unit can be electrically connected to an external power supply—itself likewise mains-powered and/or battery-powered—for example by means of a 2-wire line to form a 4-20 mA current loop or a serial field bus, and/or the electronic unit can be equipped with an internal, in some cases also rechargeable, electrochemical energy store.

The interface circuit of the aforementioned electronic unit has in each case a connection terminal that can be used for connection to an external line and also a signal input electrically connected to a signal output of the microcontroller and is designed to convert a digital signal being applied at the signal input during operation of the electronic unit to a digital signal at the connection terminal which conforms, for example, to the EIA-485 standard (RS-485). In addition, the electronic unit shown in US-A 2008/015799 is also designed, inter alia, to receive and process a digital signal output by an external transducer and arriving at the connection terminal of the interface circuit, namely to execute in the microcontroller one or more instructions contained in said signal. In the electronic unit shown in US-A 2008/015799, the signal transmission between interface circuit and microcontroller is carried out in a galvanically isolated manner, for example by means of optocoupler.

In order to enable a transmission and a reception of digital signals for one and the same connection terminal, the interface circuit can also be designed to operate in the so-called alternating mode (half-duplex) in such a way that the interface circuit receives a digital input signal being applied at the connection terminal in an operating mode that establishes readiness for reception and that also forwards instructions of the transducer to the microcontroller and converts said signal into a binary output signal which represents this digital input signal and outputs said output signal to the microcontroller, and such that the interface circuit receives a digital output signal output by the microcontroller in a different operating mode that establishes readiness for transmission and converts said signal into a binary output signal of the electronic unit which represents this digital output signal and outputs said output signal to the connection terminal or to a signal line connected thereto. When the aforementioned 2-wire line is used also for transmitting and receiving data, the data transmission can also be controlled in an acyclic manner by means of a data flow control method (handshake), for example in such a way that the interface circuit, if no request directed to the electronic unit from a higher-level data processing unit connected to the aforementioned 2-wire line is to be answered, is allowed to operate accordingly in the aforementioned operating mode which establishes readiness for reception.

As a result, the interface circuit is constantly to be kept in operation for reliable and error-free data transmission; this is especially the case even when no data whatsoever are to be transmitted between the higher-level data processing unit and the electronic unit. Especially for the aforementioned case in which the electronic unit is supplied with electrical energy only by means of internal energy stores and/or via a 2-wire line, i.e., with low power in the range of less than 100 mW 4 mA 25 V), this constitutes a particular disadvantage, which substantially limits implementation; this is even more true for the aforementioned case that the signal transmission is to take place via galvanic isolation points provided in the interface circuit, thus with nominally an even further increased power requirement.

SUMMARY

Proceeding from the prior art described above, it is an object of the invention to improve electronic units of the type in question in such a way that the respective interface thereof has a low nominal power in the case of the operating mode establishing readiness for reception, especially in such a way that the nominal power of the interface is low enough to enable use in an electronic unit supplied at least at times with electrical power of less than 100 mW.

In order to achieve this object, the invention consists of an electronic unit which is designed, for example, as a communication interface or as a remote I/O of a measuring system and/or is battery-powered, comprising:
- a microcontroller having a control input, with at least one first control output and with a signal input, which is designed for example as an asynchronous serial interface (UART) or as a switching input;
- and an interface circuit having at least one first connection terminal, a control output, a first control input and a signal output.

In the electronic unit according to the invention,
- the control output of the interface circuit is electrically connected to the control input of the microcontroller,
- the first control output of the microcontroller is electrically connected to the first control input of the interface circuit
- and the signal output of the interface circuit is electrically connected to the signal input of the microcontroller.

Both the microcontroller and the interface circuit in each case have a first operating mode and in each case at least one second operating mode, wherein the microcontroller is designed to output, in its first operating mode at the first control output, an instruction which causes the interface circuit to operate in its first operating mode, and wherein the interface circuit is designed to differentiate, at least in its first operating mode, an input signal being applied at the first connection terminal, namely to convert said input signal into a derivation signal which represents a derivative of the input signal over time and to generate a binary control signal and output it at the control output by means of said derivation signal. In addition, the microcontroller is designed in its second operating mode to output at the first control output an instruction which causes the interface circuit to operate in its second operating mode, and the interface circuit is designed, in the second operating mode thereof, to convert a digital input signal being applied at the first connection terminal, and conforming, for example, to IEC 61158 CPF15:2007 and/or EIA-485, into a binary first output signal which represents said digital input signal, and to output said first output signal at the signal output. In addition, the microcontroller is designed, in its second operating mode, to receive and process a digital input signal being applied at the signal input, for example one conforming to UART, namely to execute, for example, an instruction contained in the input signal and/or to evaluate a message contained in the input signal.

In addition, the invention also consists of a communication system formed by means of such an electronic unit, which unit additionally comprises a transducer electrically connected to the electronic unit, which transducer is designed to transmit a digital signal, especially one conforming to IEC 61158 CPF15:2007, to the electronic unit; and/or the invention also consists of a measuring system formed by means of such an electronic unit and comprising also a sensor electrically coupled to the electronic unit, wherein the microcontroller is designed to receive and evaluate, at least in its first operating mode, a sensor signal generated by means of the sensor, for example, to determine measured values for at least one measured variable detected by means of the sensor.

According to a first embodiment of the invention, it is further provided that the interface circuit is designed to react to a change in the digital input signal, namely a change, for example, in a logic level of the input signal and/or a change corresponding to a signal edge having an edge steepness of more than 1 V/µs, with the encoding into the control signal of an instruction (IRQ) which can cause the microcontroller to operate in its second operating mode or which causes the microcontroller to switch from its first operating mode into its second operating mode;

According to a second embodiment of the invention, it is further provided that the microcontroller is designed, in its first operating mode, to process the control signal of the interface circuit being applied at the control input, namely to react, for example, to an instruction which causes a switch from the first operating mode to the second operating mode with a switch into the second operating mode.

According to a third embodiment of the invention, it is further provided that the interface circuit is designed, in the first operating mode, not to convert a digital input signal being applied at the first connection terminal into an output signal which represents this input signal nor to output an output signal which represents a digital input signal being applied at the first connection terminal at the signal output.

According to a fourth embodiment of the invention, it is further provided that the microcontroller is designed not to process a digital input signal being applied at the signal input in the first operating mode, nor, for example, to carry out an instruction contained therein.

According to a fifth embodiment of the invention, it is further provided that the microcontroller is designed to switch from the second operating mode into the first operating mode in a time-controlled manner, for example when there is no digital and/or UART-conforming input signal present at the signal input.

According to a sixth embodiment of the invention, it is further provided that the interface circuit and the microcontroller are designed to operate simultaneously in the respective second operating mode such that the first output signal at the signal output of the interface circuit forms the digital input signal being applied at the signal input of the microcontroller and such that the microcontroller receives and processes said first output signal.

According to a seventh embodiment of the invention, it is further provided that the interface circuit has a, for example, passive signal filter, for example a high-pass filter.

According to an eighth embodiment of the invention, it is further provided that the interface circuit for differentiating the input signal being applied at the first connection terminal has a high-pass filter, for example a passive one and/or one having a cut-off frequency of more than 800 Hz.

In a ninth embodiment of the invention, it is further provided that the interface circuit is designed to at least temporarily and/or at least partially obtain the electrical power required during operation from the input signal being applied at the first connection terminal, to obtain said required electrical power namely in the first operating mode, for example, exclusively from the input signal being applied at the first connection terminal.

In a tenth embodiment of the invention, it is further provided that the interface circuit in the first operating mode has a power requirement that is less than 50 mW.

According to an eleventh embodiment of the invention, it is further provided that the interface circuit in the second operating mode has a power requirement which is higher than a power requirement which the interface circuit has in the first operating mode, for example more than 300% of the power requirement of the interface circuit in the first operating mode and/or more than 150 mW.

According to a twelfth embodiment of the invention, the interface circuit is further designed to obtain the required electrical power both in the first operating mode and in the second operating mode exclusively from the input signal being applied at the first connection terminal.

According to a first development of the invention, it is further provided that the microcontroller has a signal output designed, for example, as an asynchronous serial interface (UART), and the interface circuit has a signal input designed, for example, as an asynchronous serial interface (UART), and that the signal output of the microcontroller is electrically connected to the signal input of the interface.

According to a first embodiment of the first development, it is further provided that both the microcontroller as well as the interface circuit each has at least a third operating mode such that the microcontroller is designed to output, in its third operating mode, a digital second output signal conforming, for example, to UART, and being applied at the signal output, and that the interface circuit is designed, in the third operating mode thereof, to convert a digital input signal conforming, for example, to UART and being applied at the signal input, into a digital third output signal conforming to, for example, IEC 61158 CPF15:2007 and/or EIA-485. The interface circuit can further be designed to output, in the third operating mode, the third output signal at the first connection terminal. Alternatively, the interface circuit can have a second connection terminal, and the interface circuit can also be designed to output, in the third operating mode, the third output signal at said second connection terminal, but also, for example, in the first operating mode as well as in the second operating mode, not to convert an input signal being applied at the signal input into an output signal which represents the input signal nor to output at the second connection terminal an output signal which represents an input signal being applied at the signal input.

According to a second embodiment of the first development, it is further provided that the microcontroller has a second control output and the interface circuit has a second control input and that the second control output of the microcontroller is electrically connected to the second control input of the interface circuit. In addition, the microcontroller can also be designed to output, in the third operating mode, at the second control output an instruction which causes the interface circuit to operate in its third operating mode.

According to a third embodiment of the first development, the microcontroller is further designed to switch from the second operating mode into the third by being controlled by the input signal at the signal input.

According to a fourth embodiment of the first development, the microcontroller is further designed to automatically switch from the third operating mode into the first operating mode after output of the digital output signal at the signal output.

According to a fifth embodiment of the first development, the microcontroller is further designed not to process, in the third operating mode, a digital input signal being applied at the signal input, namely, for example, nor to execute any instruction arriving at the signal input.

According to a sixth embodiment of the first development, the interface circuit is further designed not to convert, in the first operating mode as well as in the second operating mode, an input signal being applied at the signal input into an output signal which represents this input signal, nor to output, at the first connection terminal, an output signal which represents an input signal being applied at the signal input.

According to a seventh embodiment of the first development, the interface circuit and the microcontroller are further designed to operate simultaneously in the respective third operating mode such that the second output signal forms, at the signal output of the microcontroller, the digital input signal being applied at the signal input of the interface circuit and such that the interface circuit receives and processes said second output signal, namely converts it, for example, into the third output signal.

According to an eighth embodiment of the first development, the interface circuit further comprises a transceiver (RS485), for example one that is compatible with IEC 61158 CPF15:2007 and/or EIA-485, and/or is monolithic, for example of the type SN65HVD1781 from Texas Instruments Inc., 2019 or of the type THVD2450 from Texas Instruments Inc., 2019, and the first connection terminal of the interface circuit is formed by means of at least one of the BUS driver/receiver terminals of the transceiver, the signal output of the interface circuit being formed by means of a digital output of the transceiver and the signal input of the interface circuit being formed by means of a digital input of the transceiver.

According to a second development of the invention, the electronic unit further comprises: a supply circuit formed, for example, by means of an electrochemical and/or rechargeable energy store, and it is further provided that the supply circuit has at least one first supply terminal and is designed to provide an operating voltage for the microcontroller at the first supply terminal, and that the microcontroller has a supply terminal electrically connected to the first supply terminal of the supply circuit.

According to a first embodiment of the second development, it is further provided that the supply circuit has a second supply terminal and is designed to provide an operating voltage for the interface circuit at the second supply terminal, and that the interface circuit has a supply terminal electrically connected to the second supply terminal of the supply circuit.

According to a first embodiment of the second development, it is further provided that the interface circuit has an electronic main switch formed, for example, by means of a semiconductor relay or by means of an insulated-gate field-effect transistor, wherein both the first control input of the interface circuit and the supply terminal of the interface circuit are formed by means of the main switch.

According to a third development of the invention, the interface circuit has a DC/DC voltage converter, which is, for example, galvanically isolated, with a converter input and with a converter output, for example a flyback converter or a push-pull converter, and the DC/DC voltage converter is designed to convert an input DC voltage being applied at the converter input into an output DC voltage being applied at the converter output with a voltage level that differs from a voltage level of the input DC voltage.

According to a fourth development of the invention, the interface circuit comprises a first optocoupler with an optical transmitting element and an optical receiver element, and it is further provided that the control output of the interface circuit is formed by means of the first optocoupler in such a way that its optical receiver element is electrically connected to the control input of the microcontroller.

According to one embodiment of the fourth development of the invention, the interface circuit in addition comprises a second optocoupler with an optical transmitting element and an optical receiver element, and it is further provided that the signal output of the interface circuit is formed by means of the second optocoupler in such a way that its optical receiver element is electrically connected to the signal input of the microcontroller. Furthermore, the interface circuit can also have at least a third optocoupler with an optical transmitting element and an optical receiver element or, for example, also a third optocoupler with an optical transmitting element and an optical receiver element and at least a fourth optocoupler, in each case having an optical transmitting element and an optical receiver element, wherein, for example, the first control input of the interface circuit can be formed by means of the third optocoupler in such a way that its optical receiver element is electrically connected to the first control output of the microcontroller.

A basic idea of the invention is to have the interface circuit of the electronic unit, controlled by the microcontroller thereof, operate selectively in a first operating mode or if necessary, for example at the request of an external transducer electrically connected to the interface circuit, in a second operating mode, in such a way that in the first operating mode a readiness for reception is established that evaluates a passive signal, namely any signal arriving at the connection terminal, solely with regard to at least one of its physical signal parameters or its temporal progression, and in the second operating mode a readiness for reception is established that forwards an active signal, namely any digital input signal arriving at the connection terminal, to the microcontroller, in some cases that also correspondingly converts the input signal for this purpose, especially in such a way that, (not until) in its second operating mode, the interface circuit transmits a message contained in the input signal for the microcontroller, for example an instruction, in a form that can be evaluated by the microcontroller. As a result of such a division of the functionality of the interface circuit with regard to its readiness for reception with respect to a digital input signal, which is occasionally or acyclically received at the connection terminal, the energy requirement of the interface circuit can be reduced to a considerable extent by the interface circuit being allowed to operate only as needed, namely only after input of the digital input signal in the comparatively energy-intensive second operating mode; advantageously, also in such a way that, when the electronic unit is operating, it is also possible to reduce the electrical power fed in as a whole by the external transducer.

The invention as well as advantageous embodiments thereof are explained in more detail below based on exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the invention that were initially explained only separately, furthermore result from the figures of the drawing and/or from the claims themselves.

DETAILED DESCRIPTION

Figure 1:
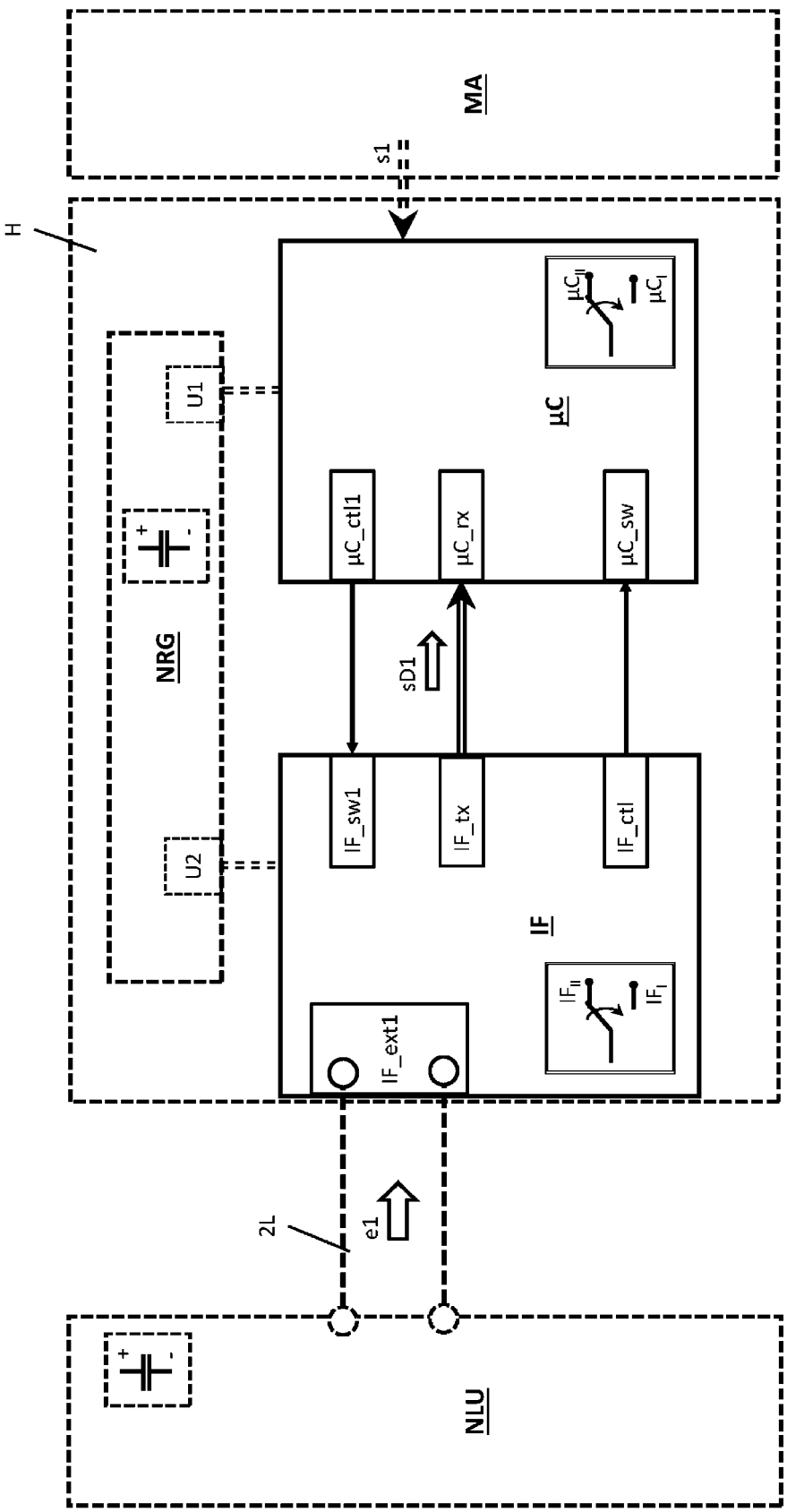
FIG. 1 schematically shows an electronic unit according to the invention as a block diagram.
Figure 2:
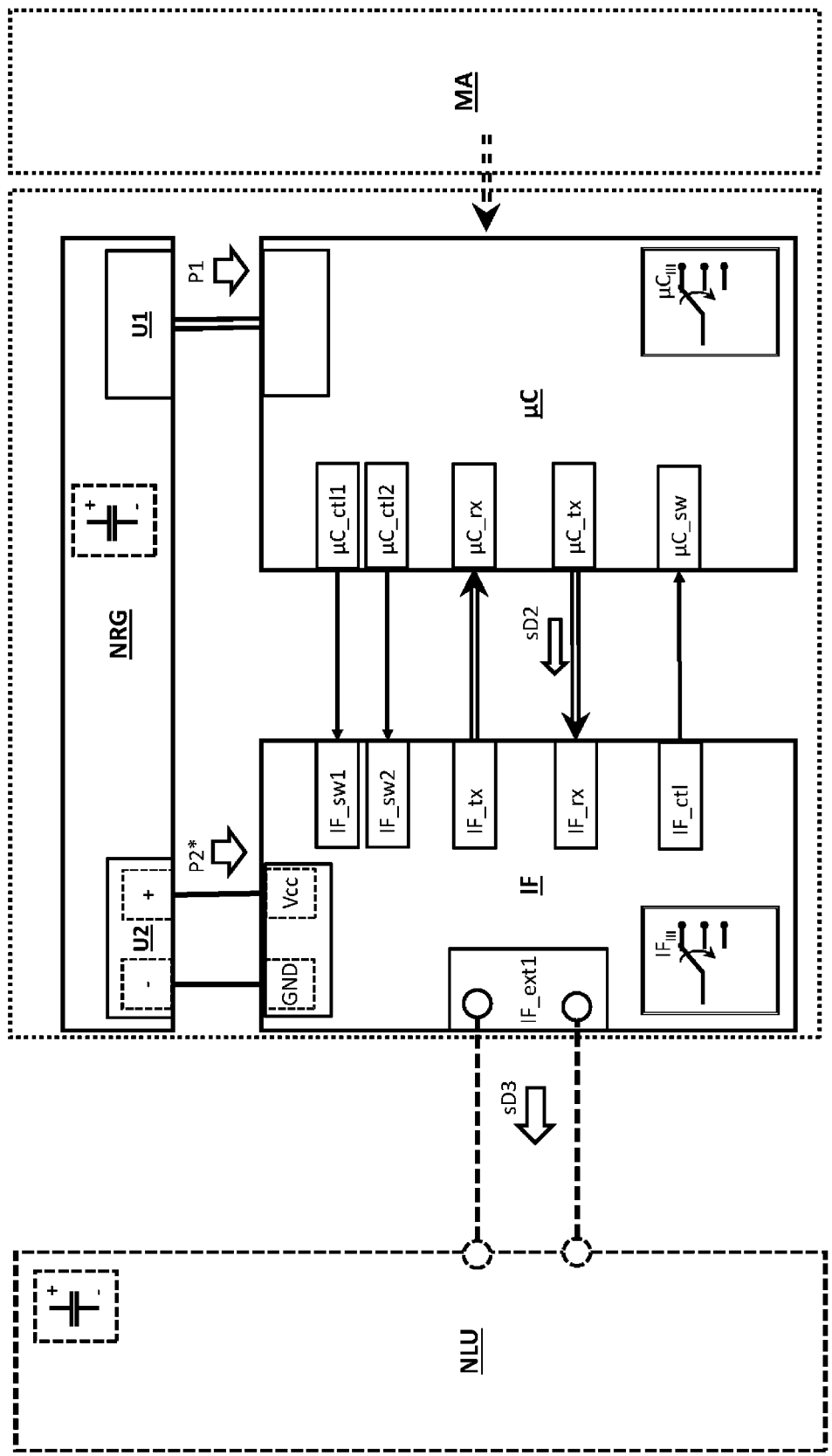
FIG. 2 schematically shows a variant of an electronic unit according to FIG. 1 as a block diagram.
Figure 3:
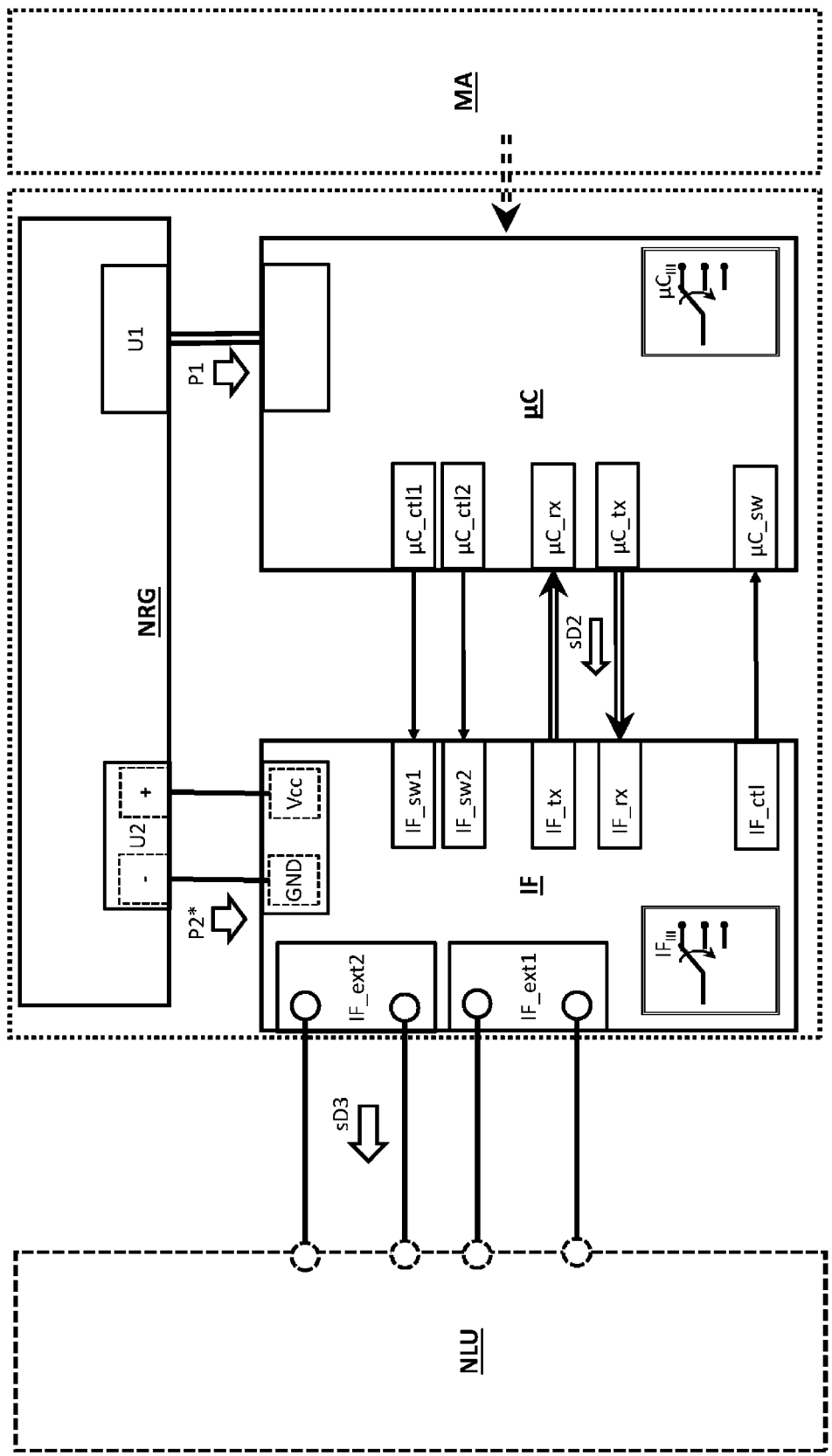
FIG. 3 schematically shows a further variant of an electronic unit according to FIG. 1 as a block diagram.

FIGS. 1, 2 and 3 schematically show various exemplary embodiments for an electronic unit formed by means of a microcontroller μC and an interface circuit IF connected thereto. The electronic unit can be, as also indicated in FIGS. 1, 2 and 3, a component, for example, of an additional communication system which is electrically connected to the electronic unit and in some cases also has a transducer NLU arranged remotely therefrom. The transducer NLU can be, for example, a remote controller (remote I/O), a programmable logic controller (PLC), a bus master in a field bus, for example according to industry standard IEC 61158:1999, especially according to one of the families CPF1 (FOUNDATION FIELDBUS), CPF3 (PROFIBUS), CPF9 (HART) or CPF15 (MODBUS), or also a radio module or a radio adapter, for example in accordance with IEEE 802.15.4: 2007 (WirelessHART), wherein the transducer NLU can be mains-powered and/or battery-powered. Alternatively or in addition, the electronic unit can also be a component of a measuring system—for example, of a measuring and/or switching device of industrial measuring and automation systems—with a sensor MA, for example, a flow-through sensor, electrically coupled to the electronic unit, which in turn is designed to capture at least one physical or chemical measured variable and to supply at least one measurement signal s1 which represents said measured variable, in particular for processing in the electronic unit. The electronic unit can further be designed to receive said measurement signal s1 and to process it accordingly, for example to determine the measured values, in some cases digital, which quantify at least one measured variable. In addition, the electronic unit, as also indicated in FIGS. 1 and 2, can be arranged within a protective housing H, which can also be attached, for example, directly to the aforementioned sensor MA while forming a measurement device of compact design.

As can be seen from FIG. 1, 2 or 3 or also the combination thereof, the interface circuit IF has at least one first connection terminal IF_ext1, a control output IF_ctl, a first control input IF_sw1 and a signal output IF_tx. In addition, the microcontroller μC has a control input μC_sw, at least one first control output μC_ctl1 and at least one signal input μC_rx. The control input μC_sw of the microcontroller μC can, for example, be an interrupt input typically provided for conventional microprocessors or microcontrollers, or the microcontroller μC may be designed to react to a (control) instruction (IRQ—interrupt request) arriving at the control input μC_sw, for example in the form of a single bit, such as logic one, with an at least temporary interruption of an initially running program or of an execution of a correspondingly predetermined interrupt routine (ISR—interrupt service routine, interrupt handler). Alternatively or in addition, the signal input μC_rx can be designed, for example, as a simple switching input or, for example, also as an asynchronous serial interface (UART—universal asynchronous receiver transmitter) or can be implemented by means of a corresponding function block of the microcontroller μC. As illustrated schematically in FIGS. 1, 2 and 3, the control output IF_ctl of the interface circuit IF is electrically connected to the control input μC_sw of the microcontroller μC, the signal output IF_tx of the interface circuit IF is electrically connected to the signal input μC_rx of the microcontroller μC, and the control output μC_ctl1 of the microcontroller μC is electrically connected to the control input IF_sw1 of the interface circuit IF. In addition, the connection terminal IF_ext1 of the interface circuit IF is designed to be electrically connected to an external signal line 2L, for example in such a way that the interface circuit IF or the electronic unit formed therewith is connected by means of the signal line 2L to a corresponding connection terminal of the aforementioned transducer NLU. In addition, the electronic unit is also designed to receive a binary input signal e1 via connection terminal IF_ext1 of the interface circuit IF and, where applicable, to process or evaluate it accordingly by means of the interface circuit IF and the microcontroller μC. The input signal e1 can, for example, be a binary (switching) signal which transmits a simple switching command from the transducer NLU or, for example, also a digital signal which transmits a telegram, for example, which is emitted by the transducer NLU and also conforms to industry standard IEC 61158 CPF15:2007.

According to a further embodiment of the invention, the microcontroller μC further comprises a signal output μC_tx, which is also designed, for example, as an asynchronous serial interface, and the interface circuit IF has a signal input IF_rx designed, for example similarly to the aforementioned signal output µC_tx, as an asynchronous serial interface. As shown in FIG. 2, the signal output µC_tx of the microcontroller and the signal input IF_rx of the interface IF are also electrically connected to one another.

In the electronic unit according to the invention, both the microcontroller µC and the interface circuit IF in each case have a first operating mode, namely an operating mode µC, or an operating mode $IF_I$, and at least a second operating mode, namely an operating mode $µC_{II}$ or an operating mode $IF_{II}$.

The microcontroller µC is in particular designed to output, in its first operating mode $µC_I$, an instruction at the control output µC_ctl1 that causes the interface circuit to operate in its operating mode $IF_I$, for example to switch into the operating mode $IF_I$, or to activate the operating mode $IF_I$. The aforementioned instruction can, for example, be a simple switching command or, for example, a statement to be executed in a program to be processed by the interface circuit IF. In addition, the microcontroller µC is also designed, in its second operating mode $µC_{II}$, to output at the control output µC_ctl1 an instruction that causes the interface circuit IF to operate in its second operating mode $IF_{II}$ and to receive and process a digital input signal being applied at its signal input µC_rx and, for example, conforming to UART, especially in such a way that an instruction contained in the input signal being applied at the aforementioned signal input µC_rx, for example a simple switching command or a statement that influences the program running in the microcontroller µC, is executed by the microcontroller µC and/or a message contained in said input signal is evaluated by the microcontroller µC. For the aforementioned case in which the electronic unit is a component of a measuring system, the microcontroller µC can also be designed, at least in its first operating mode $µC_I$, but, for example, also both in operating mode $µC_I$ and in operating mode $µC_{II}$, to receive and evaluate the aforementioned sensor signal s1 generated by means of the sensor MA, for example, to determine measured values for the at least one measured variable captured by means of the sensor MA.

Figure 4:
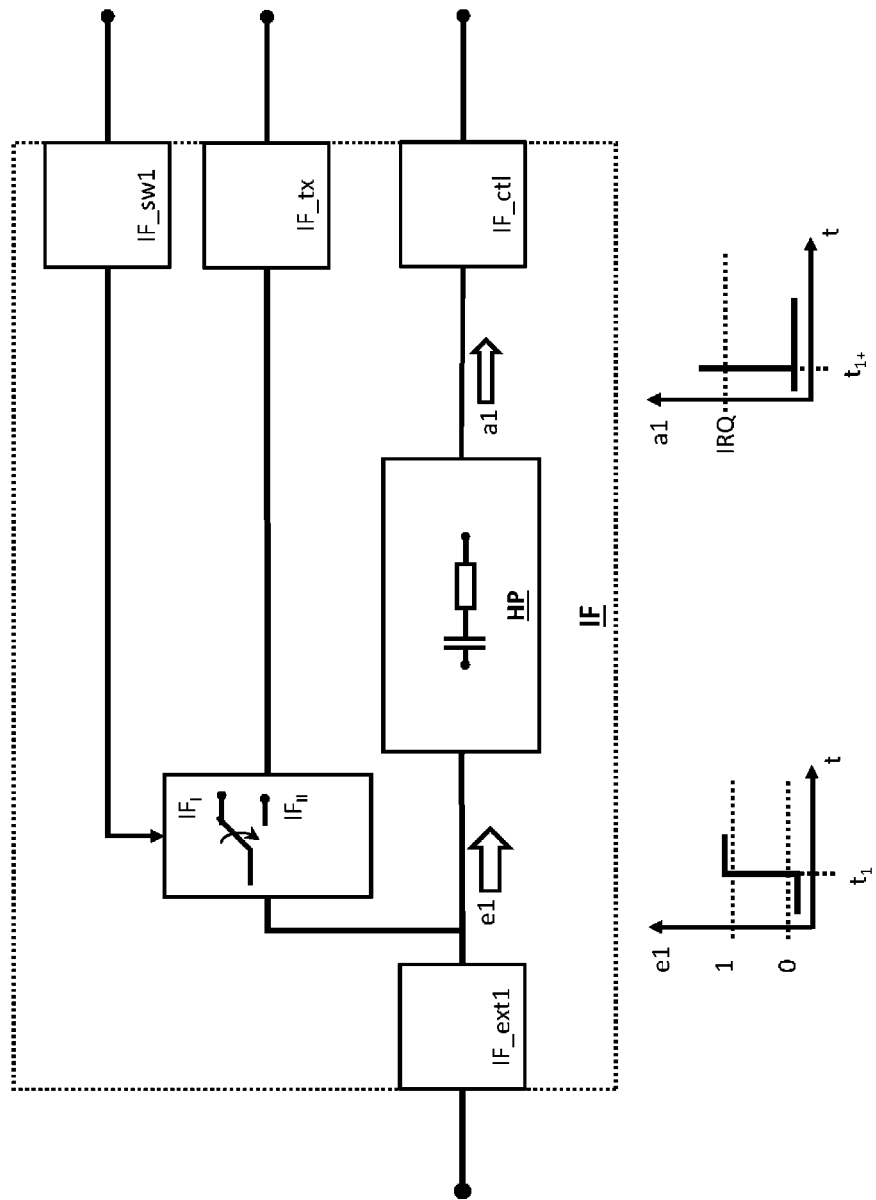
FIG. 4 schematically shows an interface circuit suitable for an electronic unit according to FIG. 1, 2 or 3, as a block diagram.

In the electronic unit according to the invention, the interface circuit IF is in turn designed, at least in the first operating mode $IF_I$, to differentiate the input signal e1 being applied at its connection terminal IF_ext1, namely, as also shown in FIG. 4, to convert it into a derivation signal a1 which represents a derivation of the input signal e1 over time, and to generate a binary control signal by means of said derivation signal a1 and to output it at the control output IF_ctl, especially in such a way that the interface circuit IF at least in the first operating mode $IF_I$—namely also, for example, only in the first operating mode $IF_I$—reacts to a prespecified rate of change of the input signal e1 with the encoding of an instruction IRQ into the control signal IF_ctl, which causes the microcontroller µC to operate in its second operating mode $µC_{II}$ or which causes the microcontroller µC to switch from its first operating mode $µC_I$ into its second operating mode $µC_{II}$. As is also indicated in FIG. 4, the derivation signal a1 can have, in the event of a change in a logic level of the binary input signal e1, for example from logic zero to logic one, a pulse-shaped level profile corresponding to this change, also namely a needle-shaped level profile when there is an abrupt change, in such a way that the derivation signal a1 temporarily reaches or exceeds a minimum signal level encoding the aforementioned instruction IRQ. In addition, the microcontroller according to a further embodiment of the invention is designed correspondingly to process, in the operating mode $µC_I$, the control signal of the interface circuit IF being applied at the control input µC_sw, namely, for example, to react to the aforementioned instruction IRQ that causes the switch from the operating mode $µC_I$ into the operating mode $µC_{II}$ with a corresponding switch into the operating mode $µC_{II}$.

According to a further embodiment of the invention, the interface circuit IF is designed especially to encode the aforementioned instruction IRQ into the control signal at the control output IF_ctl or to output said control signal at least temporarily with a corresponding signal level at the control output IF_ctl if the rate of change of the input signal e1 corresponds to a signal edge having an edge steepness of more than 1 V/µs and/or to a rate of change of more than 90%/µs which is standardized to the nominally achievable logic level and/or if the rate of change of the input signal e1 corresponds to a change in a logic level of a digital input signal conforming to industry standard IEC 61158 CPF15: 2007 (MODBUS) and/or EIA-485. According to a further embodiment of the invention, the interface circuit IF is also designed to output the derivation signal a1 directly as a control signal at the control output IF_ctl. For differentiating the input signal e1 or for generating the derivation signal a1, the interface circuit can have, for example, a corresponding signal filter, for example a high-pass filter of the first or possibly also of a higher order. A (lower) cut-off frequency of such a high-pass filter can be set for example to higher than 800 Hz, not least in the case of a use for a digital input signal conforming to industry standard IEC 61158 CPF15: 2007 and/or EIA-485. Furthermore, the interface circuit IF of the electronic unit according to the invention is also designed, in its second operating mode $IF_{II}$ to convert a digital input signal being applied at the connection terminal IF_ext1 that conforms, for example, to IEC 61158 CPF15: 2007 and/or EIA-485, for example, namely the aforementioned input signal e1, into a binary first output signal sD1 which represents this input signal and to output said output signal sD1 at the signal output IF_tx in such a way that the output signal sD1 is applied at the signal input µC_rx of the microcontroller µC or forms the aforementioned input signal at the signal input µC_rx of the microcontroller µC. Accordingly, the interface circuit IF and the microcontroller µC are also designed, according to a further embodiment of the invention, to at least temporarily operate at the same time in the respective second operating mode $IF_{II}$ or $µC_{II}$, especially in such a way that the output signal at the signal output IF_tx of the interface circuit IF forms the digital input signal being applied at the signal input pc_rx of the microcontroller µC, and in such a way that the microcontroller µC receives and processes said first output signal. According to a further embodiment of the invention, the interface circuit is also designed, in its operating mode $IF_I$, to block a digital input signal being applied at the connection terminal IF_ext1, namely not to convert the output signal into a signal which represents this input signal nor to output any output signal at the signal output IF_tx, which represents a digital input signal being applied at the connection terminal IF_ext1, and/or the microcontroller µC is designed, in its operating mode $µC_I$ to block a digital input signal being applied at the signal input µC_rx, namely not to process, especially not to execute instructions contained therein. In addition, the microcontroller µC can advantageously also be designed to switch from its operating mode $µC_{II}$ into its operating mode $µC_I$ in a time-controlled manner, not least for the case in which no digital input signal and/or no input signal conforming to UART is being applied at the signal input µC_rx.

For the aforementioned case in which the microcontroller µC has a signal output µC_tx and the interface circuit IF has a signal input IF_rx electrically connected to said signal output µC_tx, according to a further embodiment of the invention, both the microcontroller µC and the interface circuit IF each have also at least a third operating mode, namely an operating mode $\mu C_{III}$ µC or an operating mode $IF_{III}$. The microcontroller µC, as is also indicated in FIG. 3, is also designed to output a digital second output signal sD2 at the signal output µC_tx in the operating mode $\mu C_{III}$. In addition, the interface circuit IF is designed, in the operating mode $IF_{III}$, to convert a digital input signal being applied at the signal input IF_rx into a digital third output signal sD3. In particular, the interface circuit IF and the microcontroller µC are further designed to operate at least temporarily at the same time in the respective third operating mode $\mu C_{III}$ or $IF_{III}$ in such a way that the output signal sD2 at the signal output µC_tx forms the digital input signal being applied at the signal input IF_rx and that the interface circuit IF receives and processes said output signal sD2, for example converts it into the output signal sD3. The output signal sD2 can, for example, be a digital signal that conforms to UART. Alternatively or in addition, the output signal sD3 can be a digital signal conforming to any one of the aforementioned industrial standards IEC 61158 CPF15:2007 and/or EIA-485. For the aforementioned case in which the electronic unit is a component of a measuring system, the microcontroller µC can be designed especially, in its operating mode $\mu C_{III}$, to transmit measured values for the at least one measured variable captured by means of the sensor MA by means of the output signal sD2 to the interface circuit IF, or the interface circuit IF can additionally be designed to output measured values received with the output signal sD2 by means of the output signal sD3.

Not least for the case in which the aforementioned transducer NLU is designed both to emit the input signal e1 and to receive the output signal sD3 via signal line 2L and process them accordingly, the communication system thus formed is consequently provided in order to exchange data between electronic unit and transducer NLU in an alternating mode (half-duplex), and the interface circuit is further designed in its operating mode $IF_{III}$ to output the output signal sD3 at the connection terminal IF_ext1. Alternatively, the interface circuit IF, as also indicated in FIG. 2, can further also have a second connection terminal IF_ext2, and the interface circuit IF can also be designed to output in its operating mode $IF_{III}$ the aforementioned output signal sD3 at said connection terminal IF_ext2, for example in order to be able to exchange data with the aforementioned transducer NLU in a duplex transmission (full duplex). In this case, the interface circuit IF can further also be designed accordingly not only in the first operating mode $IF_I$ but also in the second operating mode $IF_{II}$ to block any input signal being applied at the signal input IF_rx, namely not to convert it into an output signal which represents this input signal nor to output any output signal at the aforementioned connection terminal IF_ext2 which represents an input signal being applied at the signal input IF_rx.

According to a further embodiment invention, the microcontroller µC is additionally designed to switch from the second operating mode $\mu C_{II}$ into the third operating mode $\mu C_{III}$ in a manner controlled by the input signal sD1 at the signal input µC_rx, for example in order to confirm an execution of an instruction encoded in the input signal sD1 and/or to respond accordingly to a request explicitly contained in the input signal sD1 or at least implicitly transmitted therewith, for example by means of the output signal sD2. As an alternative or in addition, the microcontroller µC can also be designed to switch automatically from the operating mode $\mu C_{III}$ back into the operating mode $\mu C_I$ after the digital output signal sD2 is output at the signal output µC_tx. Advantageously, the interface circuit IF can, furthermore, also be designed, both in its operating mode IF, and in its operating mode $IF_{II}$ to block any input signal being applied at the signal input IF_rx, namely, not to convert it into an output signal which represents this input signal nor to output any output signal at the connection terminal IF_ext1 which represents an input signal being applied at the signal input IF_rx, and/or the microcontroller µC can be designed in operating mode $\mu C_{III}$ not to process any digital input signal being applied at the signal input µC_rx nor to execute any instruction arriving at the signal input.

According to a further embodiment of the invention, the microcontroller µC further comprises a second control output µC_ctl2, and the interface circuit IF has a second control input IF_sw2 electrically connected to said control output µC_ctl2. For the aforementioned case, in which the microcontroller µC and interface circuit IF each also have the third operating mode, the microcontroller µC is additionally designed in its operating mode $\mu C_{III}$ to output an instruction at control output µC_ctl2, which in turn causes the interface circuit IF to operate in its operating mode $IF_{III}$, also in such a manner, for example, that the microcontroller µC in the operating mode $\mu C_{III}$, both at the control output µC_ctl2 and at the control output µC_ctl1, outputs a corresponding instruction for the operating mode $\mu C_{iii}$ and interface circuit IF.

For receiving and processing at least the digital input signal e1 arriving at the connection terminal IF_ext1, the interface circuit IF has, according to a further embodiment of the invention, a transceiver RS485 that is compatible with, for example, industry standard IEC 61158 CPF15:2007 and/or EIA-485 and/or is monolithic. The same transceiver RS485 can, for example, be a monolithic, in some cases also error-protected RS485 transceiver, for example an SN65HVD1781 from Texas Instruments Inc., Dallas, Tex. 75265, 2019 or a THVD2450 from Texas Instruments Inc., Dallas, Tex. 75265, 2019. Furthermore, it is further provided that, as is also shown schematically in FIG. 5, the transceiver RS485 has at least two BUS driver/receiver terminals A, B, at least one digital output R, at least one digital input D and at least one driver activation input DE, and that the connection terminal IF_ext1 of the interface circuit IF is formed by means of at least one of said BUS driver/receiver terminals A, B and the signal output IF_tx of the interface circuit IF is formed by means of the digital output R. For the aforementioned case that the microcontroller µC also has a signal output µC_tx and the interface circuit IF has a signal input IF_rx electrically connected to said signal output µC_tx, the signal input IF_rx of the interface circuit can also be formed by means of the aforementioned digital input D of the transceiver RS485. For the other case mentioned, in which the microcontroller µC has a control output µC_ctl2 and the interface circuit IF has a control input IF_sw2 electrically connected to said control output µC_ctl2, the control input IF_sw2 of the interface circuit can also be formed by means of the aforementioned driver activation input DE of the transceiver RS485.

In order to provide the electrical power P1 required by the microcontroller µC during operation, the electronic unit according to a further embodiment of the invention also has a supply circuit NRG with at least one first supply terminal U1. In addition, the microcontroller µC also has a corresponding supply terminal which is additionally electrically connected to the supply terminal U1 of the supply circuit NRG. The supply circuit NRG formed, for example, by means of an electrochemical and/or rechargeable energy store is additionally designed to provide an operating voltage for the microcontroller µC, for example, a unipolar or bipolar DC voltage, at the supply terminal U1. In contrast thereto, the interface circuit IF is designed to obtain the electrical power required during operation or the corresponding auxiliary power, at least at times and/or at least in part, from the input signal e1 being applied at its connection terminal IF_ext1. For this purpose, the aforementioned signal filter which is used for differentiating the input signal e1 can advantageously also be a passive signal filter, for example namely a passive high-pass filter formed by means of a simple series circuit of one or more ohmic resistors, in some cases also acting as current-limiting resistors.

According to a further embodiment of the invention, the interface circuit has in its operating mode $IF_I$ a power requirement that is less than 50 mW, and/or the interface circuit IF is designed to obtain the electrical power required both in its operating mode $IF_I$ and in its operating mode $IF_{II}$, in each case exclusively from the input signal e1 being applied at the connection terminal IF_rx. The interface circuit IF can in particular also be designed as a passive component of the electronic unit, namely can be configured to obtain the electrical power P2 required during operation fully or exclusively from the input signal e1 being applied at its connection terminal IF_ext1. Alternatively, the interface circuit IF can, however, also be designed to obtain the electrical power required during operation or auxiliary power proportional to the supply circuit NRG, and the supply circuit NRG, as also indicated in FIGS. 2 and 3, can accordingly also be designed to provide a portion P2* of the electrical power required during operation by the interface circuit IF, not least for the case that the interface circuit in its operating mode $IF_{II}$ has a power requirement which is higher than an electrical power which is nominally fed into the electronic unit by the input signal e1 and/or also for the case that the interface circuit in its operating mode $IF_{II}$ has a power requirement (P2*) that is higher than a power requirement (P1) which the interface circuit has in its operating mode $IF_I$, which, for example, is namely more than 150 mW.

Figure 5:
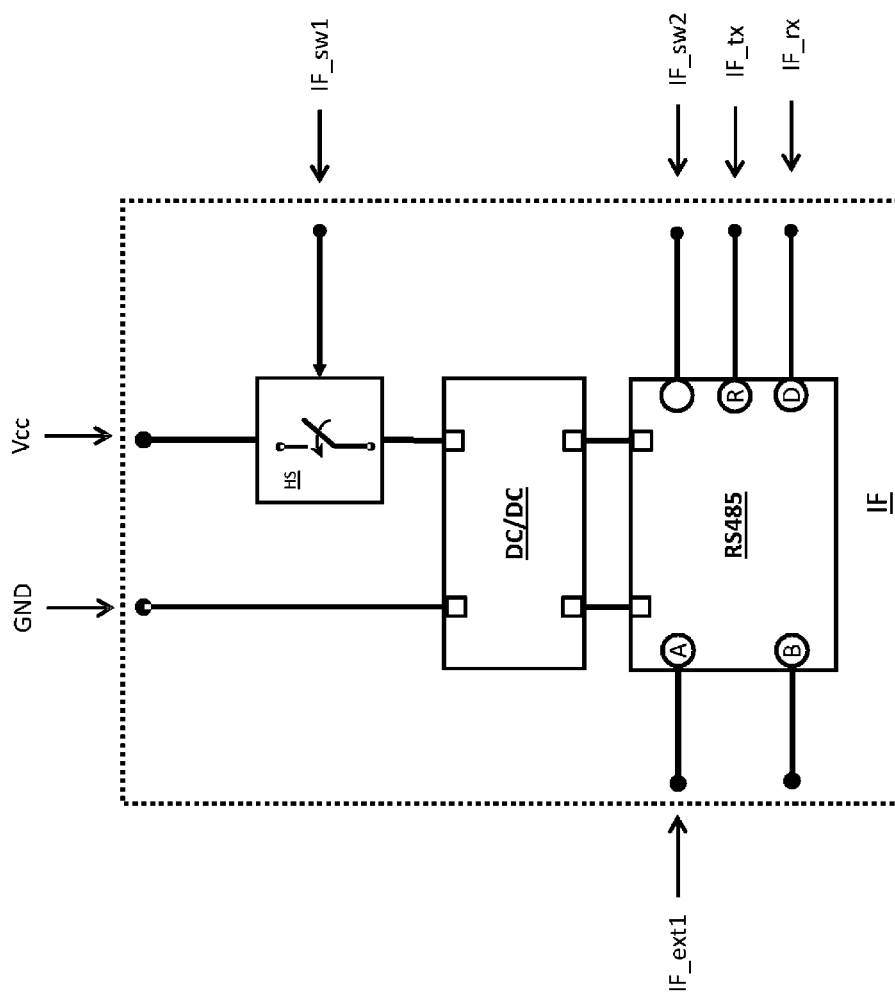
FIGS. 5, 6, 7 each schematically show as a block diagram different components of an interface circuit suitable for an electronic unit according to FIG. 1, 2 or 3.

In order to provide the electrical power P2* also required during operation by the interface circuit, the supply circuit NRG according to a further embodiment of the invention accordingly also has a second supply terminal U2 at which, during operation, an operating voltage for the interface circuit IF, for example a unipolar or bipolar DC voltage, is temporarily provided, and the interface circuit IF accordingly also has a supply terminal which is electrically connected to the supply terminal U2 of the supply circuit NRG. Not least for the aforementioned case that the transceiver RS485 is provided in the interface circuit IF, the supply terminal of the interface circuit IF, as is also indicated in FIG. 5 or also as can be readily seen when viewing FIGS. 1, 2, 3 and 5 together, can also be formed, for example, by means of two supply terminals $V_{cc}$, GND of said transceiver RS485. To stabilize and/or adjust a voltage level of the operating voltage being applied at the aforementioned supply terminal, the interface circuit IF, as is also shown schematically in FIG. 5, can also have a DC/DC voltage converter with a converter input and with a converter output, said converter also being galvanically isolated, for example, wherein the DC/DC voltage converter is designed to convert an input DC voltage being applied at the converter input—in this case the aforementioned operating voltage being applied at the supply terminal of the interface circuit IF—into an output DC voltage being applied at the converter output—said output DC voltage being used as an internal operating voltage of the interface circuit IF and having a voltage level differing from a voltage level of the input DC voltage. The DC/DC voltage converter can, for example, be a flyback converter and/or a push-pull converter.

According to a further embodiment of the invention, an electronic main switch HS is also provided in the interface circuit IF, and the control input IF_sw1 of the interface circuit IF is also formed by means of the main switch HS or a control electrode thereof. The main switch HS can, for example, be formed by means of a semiconductor relay (solid state relay) or by means of an insulated-gate field-effect transistor (IGFET), for example an n-channel MOSFET (NMOS) or another metal oxide semiconductor field-effect transistor (MOSFET). As indicated in FIG. 5, the aforementioned supply terminal $V_{cc}$, GND of the interface circuit IF can be formed by means of the main switch HS. In particular, the main switch HS of the interface circuit IF is especially also designed to switch through the operating voltage provided by the aforementioned supply circuit NRG at the supply terminal U2 from the supply terminal of the interface circuit IF to further components of the interface circuit IF, for example the DC/DC voltage converter that may be provided and/or the transceiver RS485 that may be provided, doing so only if at the control input IF_sw1 of the interface circuit IF the instruction activating its second operating mode $IF_{II}$ is being applied and/or if at the aforementioned control input IF_sw2 or both at the control input IF_sw2 and control input IF_sw1 of the interface circuit IF the instruction activating its third operating mode $IF_{III}$ is being applied.

For the aforementioned case that the interface circuit IF has the DC/DC voltage converter, the converter input of the DC/DC voltage converter can be electrically connected to the electronic main switch HS, for example in such a way that, when the electronic main switch HS is switched on at the converter input, the operating voltage for the interface circuit IF that is provided by the supply circuit NRG is being applied as input voltage of the DC/DC voltage converter for the interface circuit IF.

Figure 6:
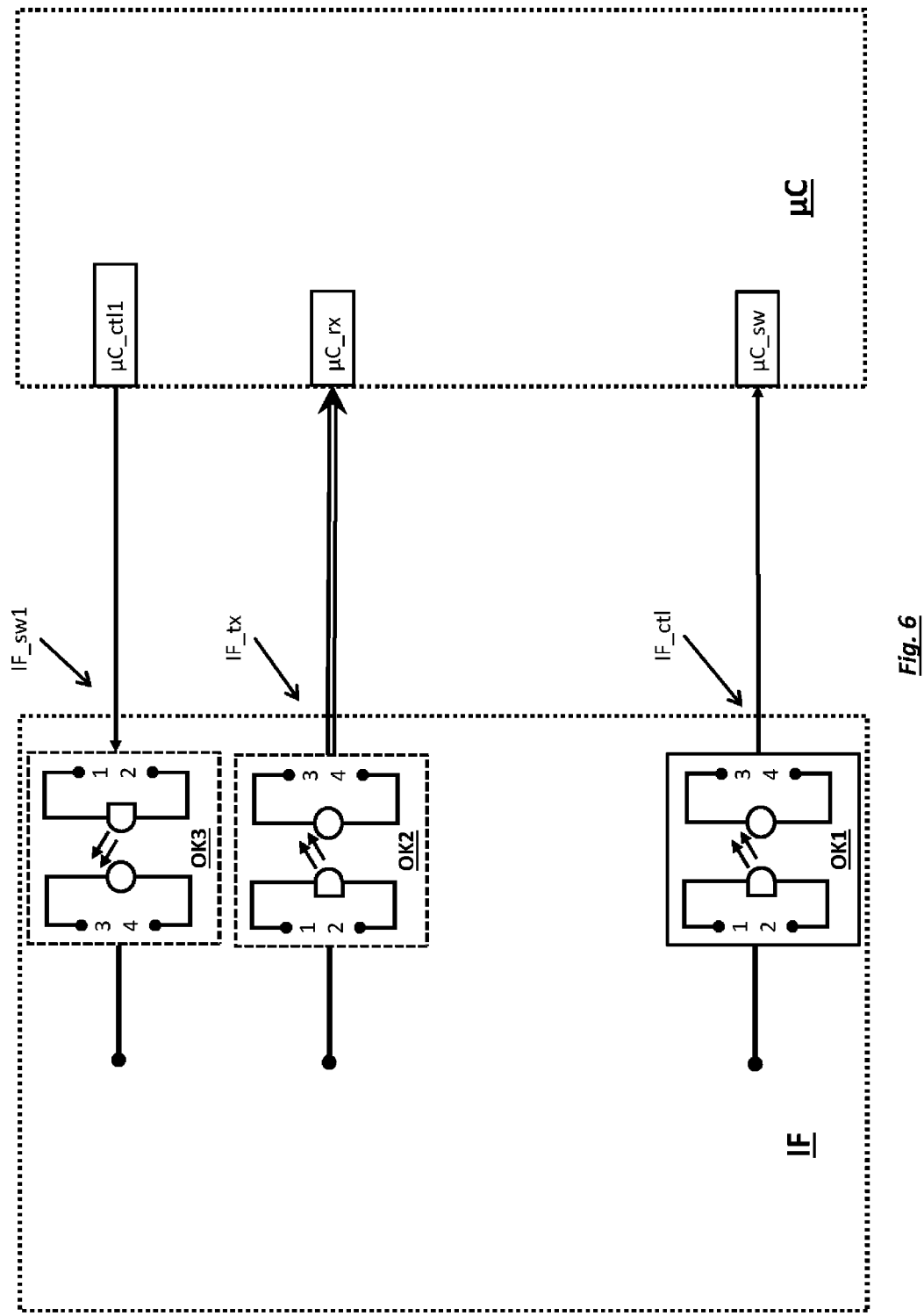
Figure 7:
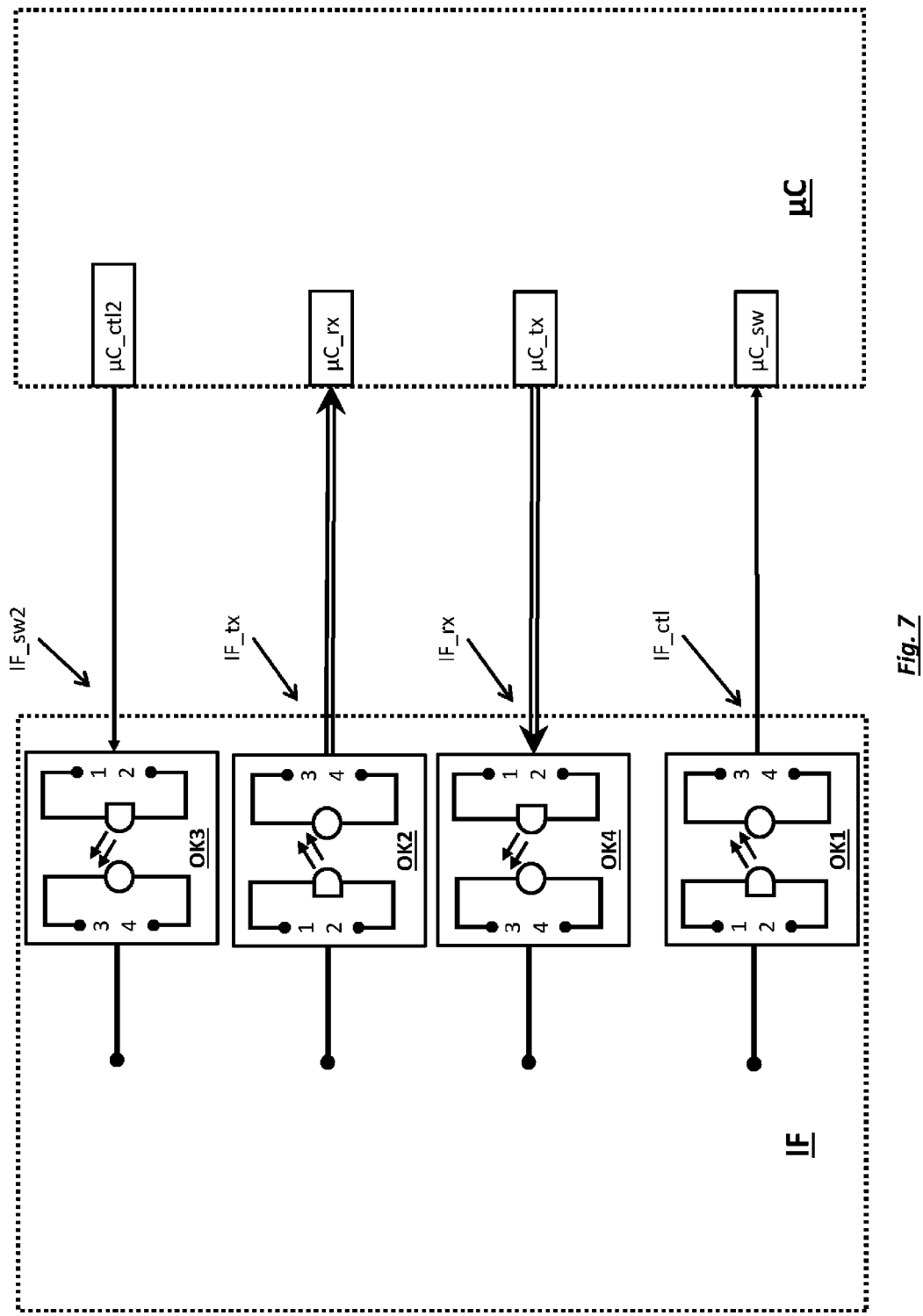

According to a further embodiment of the invention, the interface circuit IF has at least one first optocoupler OK1 with an optical transmitting element and an optical receiver element. As shown schematically in FIG. 6, the control output IF_ctl of the interface circuit IF is in particular formed by means of said optocouplers OK1, by its optical receiver element being electrically connected to the control input µC_sw of the microcontroller µC. In addition, it is also provided that the interface circuit IF additionally has a second optocoupler OK2 which is structurally identical to, for example, optocoupler OK1 and has an optical transmitting element and an optical receiver element, and that the signal output IF_tx of the interface circuit IF is formed by means of the optocoupler OK2 by its optical receiver element being electrically connected to the signal input µC_rx of the microcontroller µC, as indicated in FIG. 6. According to a development of the invention, the interface circuit IF further comprises a third optocoupler OK3 that has an optical transmitting element and an optical receiver element and is identical in design to, for example, the aforementioned optocoupler OK1, and/or the aforementioned optocoupler OK2. Not least for the aforementioned case in which the interface circuit IF is designed to fully or exclusively obtain the electrical power required during operation from the input signal e1 being applied at the connection terminal IF_ext1 (passive component), it is additionally provided that the control input IF_sw1 of the interface circuit IF is formed by means of said optocouplers OK3, such that, as also indicated in FIG. 6, its optical receiver element is electrically connected to the control output μC_ctl1 of the microcontroller μC. By using the optocouplers OK1, OK2 and OK3 to form the control output IF_ctl, the signal output IF_tx and the control input IF_sw1, microcontroller μC and interface circuit IF can advantageously be operated in a manner completely galvanically isolated from one another and, associated therewith, also a complete galvanic isolation of the microcontroller μC and of further components of the electronic unit that do not form part of the interface circuit IF can be brought about by external electrical circuits connected to the interface circuit, for example the aforementioned transducer NLU. For the other aforementioned case in which the interface circuit also has the second control input IF_sw2, said control input IF_sw2 is formed, according to another embodiment of the invention, by means of the aforementioned optocoupler OK3, such that, as also shown in FIG. 7, its optical transmitting element is electrically connected to the control output μC_ctl2 of the microcontroller μC. In addition, it is further provided for this case that the interface circuit IF also has a fourth optocoupler OK4 with an optical transmitting element and an optical receiver element, and that the signal input IF_rx of the interface circuit IF is formed by means of the optocoupler OK4 such that its optical transmitting element is electrically connected to the signal output μC_tx of the microcontroller μC. As a result, in the event that the interface circuit IF is electrically connected to the supply circuit NRG, at least in the case of operating interface circuit IF operating in the operating mode $IF_I$, a galvanic isolation is established between microcontroller μC and interface circuit IF. For the aforementioned case in which the supply circuit NRG has a DC/DC voltage converter designed as a flyback converter, the microcontroller μC and interface circuit IF can thus also be operated in a manner galvanically isolated from one another when interface circuit IF is operating in the operating mode $IF_{II}$, in some cases also in the operating mode $IF_{III}$.

The invention claimed is:

1. An electronic unit, comprising:
   a microcontroller including a control input, a first control output, and a signal input; and
   an interface circuit including a first connection terminal, a control output, a first control input, and a signal output,
   wherein the control output of the interface circuit is electrically connected to the control input of the microcontroller, the first control output of the microcontroller is electrically connected to the first control input of the interface circuit, and the signal output of the interface circuit is electrically connected to the microcontroller signal input,
   wherein the microcontroller and the interface circuit each have a first operating mode and a second operating mode,
   wherein the microcontroller is designed in the first operating mode to output at the first control output an instruction that causes the interface circuit to operate in its first operating mode,
   wherein the interface circuit is designed in the first operating mode to differentiate an input signal being applied at the first connection terminal, to convert the input signal into a derivation signal that represents a derivation of the input signal over time, to generate a binary control signal using the derivation signal and output the binary control signal at the control output that causes the microcontroller to operate in its second operating mode or that arranges for the microcontroller to switch from its first operating mode into its second operating mode,
   wherein the microcontroller is designed in the second operating mode to output at the first control output an instruction that causes the interface circuit to operate in its second operating mode,
   wherein the interface circuit is designed in the second operating mode to convert a digital input signal being applied at the first connection terminal into a binary first output signal that represents the input signal and to output the first output signal at the signal output, and
   wherein the microcontroller is further designed in the second operating mode to receive and process a digital input signal being applied at the signal input and to execute an instruction contained in the input signal and/or to evaluate a message contained in the input signal.

2. The electronic unit according to claim 1,
   wherein the interface circuit is further designed, in the first operating mode, not to convert a digital input signal being applied at the first connection terminal into an output signal which represents this input signal nor to output any output signal which represents the digital input signal being applied at the first connection terminal at the signal output; and/or
   wherein the microcontroller is further designed to process, in the first operating mode, the control signal of the interface circuit being applied at the control input and to react to the instruction with a switch into the second operating mode; and/or
   wherein the microcontroller is further designed not to process a digital input signal being applied at the signal input in the first operating mode and not to carry out an instruction contained therein; and/or
   wherein the microcontroller is designed to switch from the second operating mode into the first operating mode in a time-controlled manner if no digital and/or UART-conforming input signal is being applied at the signal input; and/or
   wherein the interface circuit and the microcontroller are further designed to operate simultaneously in the respective second operating mode such that the first output signal at the signal output of the interface circuit forms the digital input signal being applied at the signal input of the microcontroller and such that the microcontroller receives and processes said first output signal.

3. The electronic unit according to claim 2,
   wherein the microcontroller includes a signal output designed as an asynchronous serial interface, and the interface circuit includes a signal input designed as an asynchronous serial interface, and
   wherein the signal output of the microcontroller is electrically connected to the signal input of the interface.

4. The electronic unit according to claim 3,
   wherein the microcontroller and the interface circuit each has a third operating mode,
   wherein the microcontroller is designed to output, in the third operating mode, a digital second output signal at the signal output, and wherein the interface circuit is designed, in the third operating mode, to convert a digital input signal being applied at the signal input into a digital third output signal conforming to IEC 61158 CPF15:2007 and/or EIA-485.

5. The electronic unit according to claim 4,
wherein the interface circuit includes a second connection terminal, and
wherein the interface circuit is designed to output, in the third operating mode, the third output signal at the second connection terminal.

6. The electronic unit according to claim 1, wherein the interface circuit is designed not to convert an input signal being applied at the signal input in the first operating mode and in the second operating mode into an output signal which represents the input signal nor to output at the second connection terminal any output signal which represents an input signal being applied at the signal input.

7. The electronic unit according to claim 4, wherein the interface circuit is designed to output, in the third operating mode, the third output signal at the first connection terminal.

8. The electronic unit according to claim 4,
wherein the microcontroller includes a second control output and the interface circuit includes a second control input, and
wherein the second control output of the microcontroller is electrically connected to the second control input of the interface circuit.

9. The electronic unit according to claim 4, wherein the microcontroller is designed to output, in the third mode of operation, an instruction that causes the interface circuit to operate in its third mode of operation at the second control output.

10. The electronic unit according to claim 4,
wherein the microcontroller is designed to switch from the second into the third operating mode in a manner controlled by the input signal at the signal input; and/or
wherein the microcontroller is designed to automatically switch from the third operating mode into the first operating mode after the output of the digital output signal at the signal output; and/or
wherein the interface circuit in both the first operating mode and the second operating mode is designed not to convert a input signal being applied at the signal input into an output signal being applied at the signal input, nor to output at the first connection terminal any output signal which represents an input signal being applied at the signal input; and/or
wherein the microcontroller is designed not to process a digital input signal being applied at the signal input in the third operating mode, and also in particular does not execute any instruction arriving at the signal input; and/or
wherein the interface circuit and the microcontroller are designed to operate simultaneously in the respective third operating mode such that the second output signal forms, at the signal output of the microcontroller, the digital input signal being applied at the signal input of the interface circuit and such that the interface circuit receives and processes said second output signal and converts it into the third output signal.

11. The electronic unit according to claim 4,
wherein the interface circuit includes a transceiver compatible with IEC 61158 CPF15:2007 and/or EIA-485 and/or is monolithic, and
wherein the first connection terminal of the interface circuit is formed by at least one of the BUS driver/receiver terminals of the transceiver, the signal output of the interface circuit is formed by a digital output of the transceiver, and the signal input of the interface circuit is formed by a digital input of the transceiver.

12. The electronic unit according to claim 1, wherein the interface circuit is designed to obtain the electrical power required both in the first operating mode and in the second operating mode exclusively from the input signal being applied at the first connection terminal.

13. The electronic unit according to claim 1, further comprising:
a supply circuit formed by an electrochemical and/or rechargeable energy store,
wherein the supply circuit includes a first supply terminal and is designed to provide an operating voltage for the microcontroller at the first supply terminal, and
wherein the microcontroller includes a supply terminal which is electrically connected to the first supply terminal of the supply circuit.

14. The electronic unit according to claim 13,
wherein the supply circuit includes a second supply terminal and is designed to provide an operating voltage for the interface circuit at the second supply terminal, and
wherein the interface circuit includes a supply terminal electrically connected to the second supply terminal of the supply circuit.

15. The electronic unit according to either of claims 11, wherein the supply terminal of the interface circuit is formed by two supply terminals of the transceiver.

16. The electronic unit according to claims 15, wherein the interface circuit includes an electronic main switch formed by a semiconductor relay or by an insulated-gate field-effect transistor, wherein both the first control input of the interface circuit and the supply terminal of the interface circuit are formed by the main switch.

17. The electronic unit according to claim 16, wherein the interface circuit includes a galvanically isolated DC/DC voltage converter with a converter input and with a converter output, wherein the DC/DC voltage converter is designed to convert an input DC voltage being applied at the converter input into an output DC voltage being applied at the converter output with a voltage level that differs from a voltage level of the input DC voltage.

18. The electronic unit according to claim 17, wherein the converter input of the DC/DC voltage converter is electrically connected to the electronic main switch such that when the electronic main switch is connected conductively, the operating voltage for the interface circuit that is provided by the supply circuit is applied at the converter input.

19. The electronic unit according to claim 8, wherein the interface circuit comprises a first optocoupler with an optical transmitting element and an optical receiver element, wherein the control output of the interface circuit is formed by the first optocoupler such that its optical receiver element is electrically connected to the control input of the microcontroller.

20. The electronic unit according to claim 19, wherein the interface circuit includes a second optocoupler including an optical transmitting element and an optical receiver element, wherein the signal output of the interface circuit is formed by means of the second optocoupler in such a way that its optical receiver element is electrically connected to the signal input of the microcontroller.

21. The electronic unit according to claim 20, wherein the interface circuit includes a third optocoupler with an optical transmitting element and an optical receiver element.

22. The electronic unit according to claim 21, wherein the first control input of the interface circuit is formed by the third optocoupler such that its optical receiver element is electrically connected to the first control output of the microcontroller.

23. The electronic unit according to claim 21, wherein the second control input of the interface circuit is formed by the third optocoupler such that its optical transmitting element is electrically connected to the second control output of the microcontroller.

24. The electronic unit according to claim 23, wherein the interface circuit includes a fourth optocoupler including an optical transmitting element and an optical receiver element, wherein the signal input of the interface circuit is formed by the fourth optocoupler such that its optical transmitting element is electrically connected to the signal output of the microcontroller.

25. The electronic unit according to claim 1, wherein the interface circuit includes a passive high-pass signal filter.

26. The electronic unit according to claim 1, wherein the interface circuit for differentiating the input signal being applied at the first connection terminal includes a passive high-pass filter and/or a high-pass filter having a cut-off frequency of more than 800 Hz.

27. The electronic unit according to claim 1,
wherein the interface circuit is designed to at least temporarily and/or at least partially obtain the required electrical power during operation from the input signal being applied at the first connection terminal, in particular to obtain said electrical power required namely in the first operating mode exclusively from the input signal being applied at the first connection terminal; and/or
wherein in the first operating mode the interface circuit has a power requirement that is less than 50 mW; and/or
wherein the interface circuit in the second operating mode has a power requirement which is higher than a power requirement which the interface circuit has in the first operating mode, more than 300% of the power requirement of the interface circuit in the first operating mode and/or more than 150 mW.

28. A communication system comprising:
an electronic unit, including:
a microcontroller including a control input, a first control output, and a signal input; and
an interface circuit including a first connection terminal, a control output, a first control input, and a signal output,
wherein the control output of the interface circuit is electrically connected to the control input of the microcontroller, the first control output of the microcontroller is electrically connected to the first control input of the interface circuit, and the signal output of the interface circuit is electrically connected to the microcontroller signal input,
wherein the microcontroller and the interface circuit each has a first operating mode and a second operating mode,
wherein the microcontroller is designed in the first operating mode to output at the first control output an instruction that causes the interface circuit to operate in its first operating mode,
wherein the interface circuit is designed in the first operating mode to differentiate an input signal being applied at the first connection terminal, to convert the input signal into a derivation signal that represents a derivation of the input signal over time, to generate a binary control signal using the derivation signal and output the binary control signal at the control output, that causes the microcontroller to operate in its second operating mode or that arranges for the microcontroller to switch from its first operating mode into its second operating mode,
wherein the microcontroller is designed in the second operating mode to output at the first control output an instruction that causes the interface circuit to operate in its second operating mode;
wherein the interface circuit is designed in the second operating mode to convert a digital input signal being applied at the first connection terminal into a binary first output signal that represents the input signal and to output the first output signal at the signal output, and
wherein the microcontroller is further designed in the second operating mode to receive and process a digital input signal being applied at the signal input and to execute an instruction contained in the input signal and/or to evaluate a message contained in the input signal; and
a transducer electrically connected to the electronic unit, wherein the transducer is designed to transmit a digital signal to the electronic unit.

29. A measuring system, comprising:
an electronic unit, including:
a microcontroller including a control input, a first control output, and a signal input; and
an interface circuit having a first connection terminal, a control output, a first control input, and a signal output,
wherein the control output of the interface circuit is electrically connected to the control input of the microcontroller, the first control output of the microcontroller is electrically connected to the first control input of the interface circuit, and the signal output of the interface circuit is electrically connected to the microcontroller signal input,
wherein the microcontroller and the interface circuit each has a first operating mode and a second operating mode,
wherein the microcontroller is designed in the first operating mode to output at the first control output an instruction that causes the interface circuit to operate in its first operating mode,
wherein the interface circuit is designed in the first operating mode to differentiate an input signal being applied at the first connection terminal, to convert the input signal into a derivation signal that represents a derivation of the input signal over time, to generate a binary control signal using the derivation signal and output the binary control signal at the control output, that causes the microcontroller to operate in its second operating mode or that arranges for the microcontroller to switch from its first operating mode into its second operating mode,
wherein the microcontroller is designed in the second operating mode to output at the first control output an instruction that causes the interface circuit to operate in its second operating mode;
wherein the interface circuit is designed in the second operating mode to convert a digital input signal being applied at the first connection terminal into a binary first output signal that represents the input signal and to output the first output signal at the signal output, and
wherein the microcontroller is further designed in the second operating mode to receive and process a digital input signal being applied at the signal input and to execute an instruction contained in the input signal and/or to evaluate a message contained in the input signal; and a sensor electrically coupled to the electronic unit, wherein the microcontroller is designed to receive and evaluate, at least in the first operating mode, a sensor signal generated by the sensor.

\* \* \* \* \*